(12) United States Patent
Egolf

(10) Patent No.: US 6,446,034 B1
(45) Date of Patent: Sep. 3, 2002

(54) PROCESSOR EMULATION VIRTUAL MEMORY ADDRESS TRANSLATION

(75) Inventor: David Egolf, Glendale, AZ (US)

(73) Assignee: Bull HN Information Systems Inc., Bilerica, MA (US)

( * ) Notice: Subject to any disclaimer, the term of this patent is extended or adjusted under 35 U.S.C. 154(b) by 0 days.

(21) Appl. No.: 09/212,968

(22) Filed: Dec. 16, 1998

(51) Int. Cl.[7] .................................. G06F 9/44
(52) U.S. Cl. ..................... 703/27; 703/28; 711/208; 712/25; 712/227
(58) Field of Search ............... 703/27, 20, 24, 703/28; 711/172, 208; 712/25, 227

(56) References Cited

U.S. PATENT DOCUMENTS

| | | | | |
|---|---|---|---|---|
| 4,972,338 A | * | 11/1990 | Crawford et al. | 364/200 |
| 5,652,872 A | * | 7/1997 | Richter et al. | 395/500 |
| 5,765,206 A | * | 6/1998 | Hohensee et al. | 711/203 |
| 5,781,750 A | * | 7/1998 | Blomgren et al. | 395/385 |
| 5,854,913 A | * | 12/1998 | Goetz et al. | 395/386 |
| 5,926,841 A | * | 7/1999 | Novak et al. | 711/208 |
| 5,953,516 A | * | 9/1999 | Bonola | 395/500 |
| 5,953,520 A | * | 9/1999 | Mallick | 395/500.47 |
| 5,956,495 A | * | 9/1999 | Kahle et al. | 395/500 |
| 5,956,751 A | * | 9/1999 | Lai | 711/172 |
| 6,219,774 B1 | * | 4/2001 | Hammond et al. | 711/202 |

OTHER PUBLICATIONS

Bull HN Information Systems Inc. GC0S8 Operating System Programmers Guide, DPS9000G Assembly Instructions, Mar. 1998.

* cited by examiner

Primary Examiner—Hugh M. Jones
Assistant Examiner—Thai Phan
(74) Attorney, Agent, or Firm—B. E. Hayden; J. H. Phillips; J. S. Solakian

(57) ABSTRACT

When emulating a Target architecture on a Host system having a different architecture, virtual to real address translation is typically expensive in terms of computer cycles. The cost can be significantly reduced by utilizing direct page table pointers to short-circuit the address translation. In a system additionally supporting segments framing portions of virtual memory, the direct page table pointers are associated with segment registers and point to the page table entry corresponding to the first location in a segment. Direct page table pointers are invalidated when underlying virtual memory management tables are modified.

21 Claims, 10 Drawing Sheets

PROCESSOR EMULATION VIRTUAL MEMORY ADDRESS TRANSLATION

CROSS REFERENCE TO RELATED APPLICATION

This application is related to our copending patent applications assigned to the assignee hereof: "DIFFERENT WORD SIZE MULTIPROCESSOR EMULATION" by David A. Egolf, filed on Sep. 8, 1998, with Ser. No. 09/149,261 which issued on Mar. 19, 2002 as U.S. Pat. No. 6,360,194 and "PROCESSOR EMULATION INSTRUCTION COUNTER VIRTUAL MEMORY ADDRESS TRANSLATION" by George Mann and Bruce Hayden, filed on Dec. 15, 1998, with Ser. No. 09/212,809 that issued on Jan. 15, 2002 as U.S. Pat. No. 6,339,752.

FIELD OF THE INVENTION

The present invention generally relates to computer system emulation, and more specifically to emulation of a Target system utilizing a multiprocessor Host system with a dissimilar word length.

BACKGROUND OF THE INVENTION

The cost of designing a computer processor continues to increase. Some computer architectures thus ultimately become uneconomical to implement directly, despite these architectures having significant installed bases.

One solution to this problem is to simulate (or emulate) one computer architecture on another computer architecture. Herein, the simulating (or emulating) computer architecture will be termed the "Host" computer system, while the simulated (or emulated) computer architecture will be termed the "Target" computer system. Emulators have been available almost since the advent of the first compilers.

One problem that arises in emulating one computer architecture on another involves address translation. In virtual memory computer systems, it is necessary to translate from operand and instruction virtual addresses to real memory addresses. In older computer systems, this translation was rudimentary. As computer technology progressed, this translation of virtual addresses to real addresses has continued to become ever more complicated.

Full virtual to real address translation typically consumes significant computer cycles, whether done in hardware, or in an emulator. When emulating a complex computer architecture, such as the GCOS® 8 architecture provided to customers by the assignee herein, full virtual to real address translation may take upwards of a hundred instructions to accomplish. The problem is compounded by the necessity to translate at least two virtual addresses per instruction executed for most instructions executed or emulated: one to fetch the instruction to execute, and a second one for the instruction operand.

Hardware implementations have addressed this complexity and sped up the virtual to real address translations with a number of hardware assists that have been developed over time. One such hardware assist is the use of look-aside buffers, where recent operand and instruction addresses, along with their virtual to real address translations, are maintained. Instead of immediately doing virtual to real address translations, a search is made first of the look-aside buffer. If the virtual page address has been recently translated, the corresponding real page address for the operand or instruction can be taken from the look-aside buffer. This eliminates the repeated need for expensive virtual to real address translation. This ability to test or compare a number of addresses in parallel in hardware is well understood in the prior art, and is one of the fundamental bases for N-way set associative cache memories.

Software emulations typically cannot take advantage of this look-aside buffer strategy since Host systems seldom supply general-purpose associative memory capabilities. Instead, they must resort to a costly search to implement the same strategy. A pragmatic result is that an implementation which performs the fill address development is in many cases cheaper than implementing the look-aside buffer technique.

When virtual to real address translation is done in software in an emulator, it is typically not possible on a Single Instruction/Single Data (SISD) processor to test or compare the virtual page address being translated against more than one previous virtual page address at a time. Thus, the previous virtual page addresses in the look-aside buffer would have to be tested sequentially. The result of this constraint is that it is often as expensive, or maybe even more expensive, in terms of computer cycles to utilize a look-aside buffer for caching virtual to real address translations as compared to performing full address translation for each address utilized.

It would be advantageous to be able to efficiently translate virtual to real addresses in an emulator. An efficient method of performing this address translation would significantly reduce the cost of emulating one (Target) computer system utilizing a second (Host) computer system.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Emulating a first computer architecture on a second computer architecture is a well known technique in the area of data processing. It is becoming more common as the cost of developing new generation computer architectures continues to escalate. A program, called an "emulator", on a data processing system with the second computer architecture executes code designed for the first computer architecture: in essence pretending that it has the first computer architecture. The computer system having the second computer architecture and that executes the emulator program is termed the "Host" computer system. A virtual computer system having the first ("emulated") computer architecture is termed the "Target" system. Often both Target user and operating system software is executed together by the emulator on the Host system, with the Target operating system managing resources for the Target user programs.

The GCOS® 8 data processing system has a complex 36-bit word architecture. In the preferred embodiment, a Target GCOS 8 computer system is emulated on a Host computer system having a different word size. In that preferred embodiment, the Host computer system has a 64-bit word size. One such Host computer architecture having a 64-bit word size is the Intel Merced architecture. However, other Host and Target architectures are within the scope of this invention.

Figure 1:
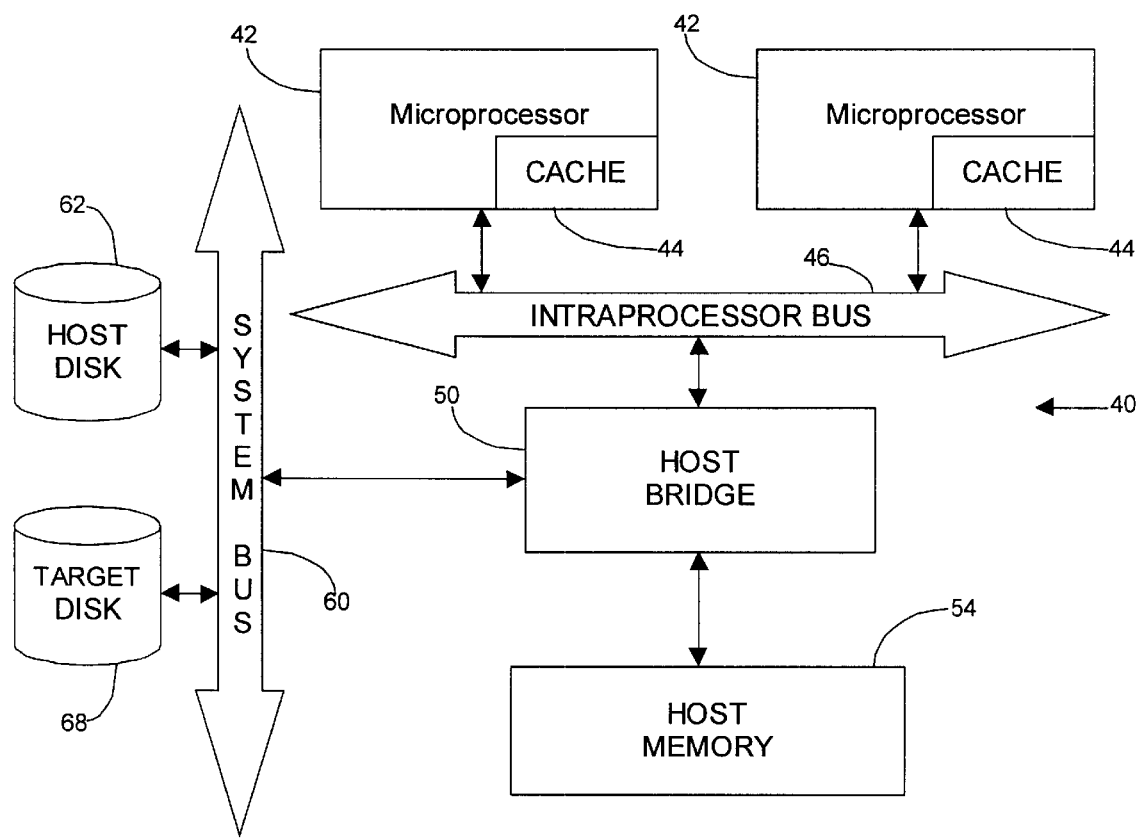
FIG. 1 is a block diagram illustrating a multiprocessor Host system utilized to emulate a Target system with a narrower word size, in accordance with the present invention.

FIG. 1 is a block diagram illustrating a multiprocessor Host system utilized to emulate a Target system with a narrower word size. In the preferred embodiment, the Host system utilizes 64-bit words, whereas the Target system supports 36-bit words. A multiprocessor system is shown in order to provide the level of performance necessary to emulate large-scale enterprise level Target systems. The multiprocessor system 40 shows two (2) microprocessors 42, each containing its own local cache memory 44. Some examples of microprocessors include Pentium II and Merced microprocessors from Intel Corporation, PowerPC microprocessors from Motorola, Inc. and IBM, and SPARC processors from Sun Microsystems. The cache memory 44 is typically implemented as extremely high-speed static random access memory (SRAM). The cache memory 44 may be implemented on the same semiconductor die as the microprocessor 42, or may be implemented as part of a multi-chip-module (MCM) with the microprocessor 42. In any case, the cache memory 44 for each microprocessor 42 is dedicated to that microprocessor 42. Note here that a single level of cache memory 44 is illustrative. Other cache memory configurations are within the scope of this invention. Note also that two microprocessors are shown. This is for illustrative purposes, and it is understood that this invention envisions emulating a multiprocessor Target system on either a single processor or a multiprocessor Host system.

The two shown microprocessors 42 are coupled by and communicate over an intraprocessor bus 46. One of the functions of this intraprocessor bus 46 is to allow the two microprocessors 42 to communicate sufficiently so as to maintain coherence between their respective cache memories 44. A single bus has been shown. However, multiple busses are also within the scope of this invention.

Also coupled to the intraprocessor bus 46 is a Host bridge 50. This provides communications between the microprocessors 42 and the remainder of the computer system 40. Coupled to the Host Bridge 50 is Host memory 54. This is typically Dynamic Random Access Memory (DRAM). However, other types of memory may be utilized, including SRAM. Host memories 54 typically contain several orders of magnitude more memory than the cache memories 44.

Also coupled to the Host Bridge 50 is a system bus 60. The system bus 60 is utilized to couple the system 40 to lower speed peripheral devices. These lower speed peripheral devices can include display monitors, keyboards, communications devices, and the like (not shown here). Also coupled to the system bus are disk drives and other forms of storage capable of permanently storing data for the computer system 40. Shown in this figure are a Host disk drive 62 and a Target disk drive 68. The Host disk drive 62 typically contains the software required to emulate the Target system on the Host system. The Target disk drive 68 contains the software being emulated. It should be. noted that the Host disk drive 62 is shown distinct from the Target disk drive 68. Additionally, only a single Host disk drive 62 and Target disk drive 68 are shown. It is shown this way for illustrative purposes. However, the present invention also envisions combining the two on shared drives. It must also be noted that the Target disk drive 68 will often actually consist of a large number of different physical disk drives. This is especially true when Host systems capable of supporting enterprise level databases are emulated.

Memory is considered herein a relatively high speed machine readable medium and includes Volatile Memories, such as DRAM 54, and SRAM 44, and Non-Volatile Memories (not shown) such as, ROM, FLASH, EPROM, EEPROM, and bubble memory. Secondary Storage 62, 68 includes machine-readable media such as hard disk drives, magnetic drum, and bubble memory. External Storage (not shown) includes machine-readable media such as floppy disks, removable hard drives, magnetic tape, CD-ROM, and even other computers, possibly connected via a communications line. The distinction drawn here between Secondary Storage 62, 68 and External Storage is primarily for convenience in describing the invention. As such, it should be appreciated that there is substantial functional overlap between these elements. Computer software such as Target emulation software and user programs can be stored in a Computer Software Storage Medium, such as Memory 44, 54, Secondary Storage 62, 68, and External Storage. Executable versions of computer software can be read from a Non-Volatile Storage Medium such as External Storage (not shown), Secondary Storage 62, 68, and Non-Volatile Memory (not shown), and loaded. for execution directly into Volatile Memory 44, 54, executed directly out of Non-Volatile Memory, or stored on the Secondary Storage 62, 68 prior to loading into Volatile Memory 44, 54 for execution.

Virtual memory provides a processor with an apparent or virtual memory address space much larger than the real memory actually employed. It also allows provides a contiguous address space employing discontiguous real memory pages. In the GCOS® 8 environment, this capability consists of a directly addressable virtual space of $2^{**}43$ bytes and the mechanisms for translating this virtual memory address into a real memory address.

In order to provide for virtual memory management, assignment, and control, the $2^{}43$-byte virtual memory space is divided into smaller units called working spaces and segments. The $2^{}43$ bytes of virtual memory space are divided into 512 $2^{}34$ byte working spaces (WS). Each WS has a unique WS number (WSN). These working space numbers are used to generate a particular virtual memory address. They are obtained indirectly from one of the eight 9-bit WS registers, or directly from one of the descriptor registers. Note that in XV mode, WSNs are 18 bits long, resulting in 256 k word working spaces. Each working space is further broken into $2^{}22$ 1024 ($2^{}10$)-word or 4096 ($10^{}12$)-byte virtual pages. Each virtual page, when present, will map to a physical or "real" page of the same size.

A segment is a part of a working space and may be as small as one byte or as large as $2^{**}32$ bytes for an extended segment. Thus, unlike the fixed size of a working space (WS), a segment size is variable. Segments are addressed by a 72-bit data item called a "descriptor" or a "segment descriptor". Segments can be viewed as "framing" a portion of a working space. Multiple segments may frame different portions of the same working space, and may even overlap. Typically segments are setup by the operating system, but may be shrunk by unprivileged user programs.

When a virtual address is generated, a portion of the information comes from a segment descriptor contained in a register such as the instruction segment register (ISR). For operands, the descriptor may be contained in other segment descriptor registers. The area of virtual memory constituting a segment is "framed" by its segment descriptor by defining a base value relative to the base of the working space and a bound value relative to the base of the segment.

For all memory accesses, a virtual address must be generated. This includes operand or descriptor loads and stores, as well as instruction fetches. The mechanics of generating the virtual memory address depends on whether the involved segment descriptor is a standard segment descriptor or a super segment descriptor. Thus the procedures described below for generating an operand virtual address with a standard segment descriptor also applies to virtual address generation for accessing the instruction, argument, parameter, and linkage segments, since the registers holding these segment descriptors can only contain standard segment descriptors (with the exception of the instruction segment register (ISR) which may alternatively contain extended descriptors in EI mode).

Figure 2:
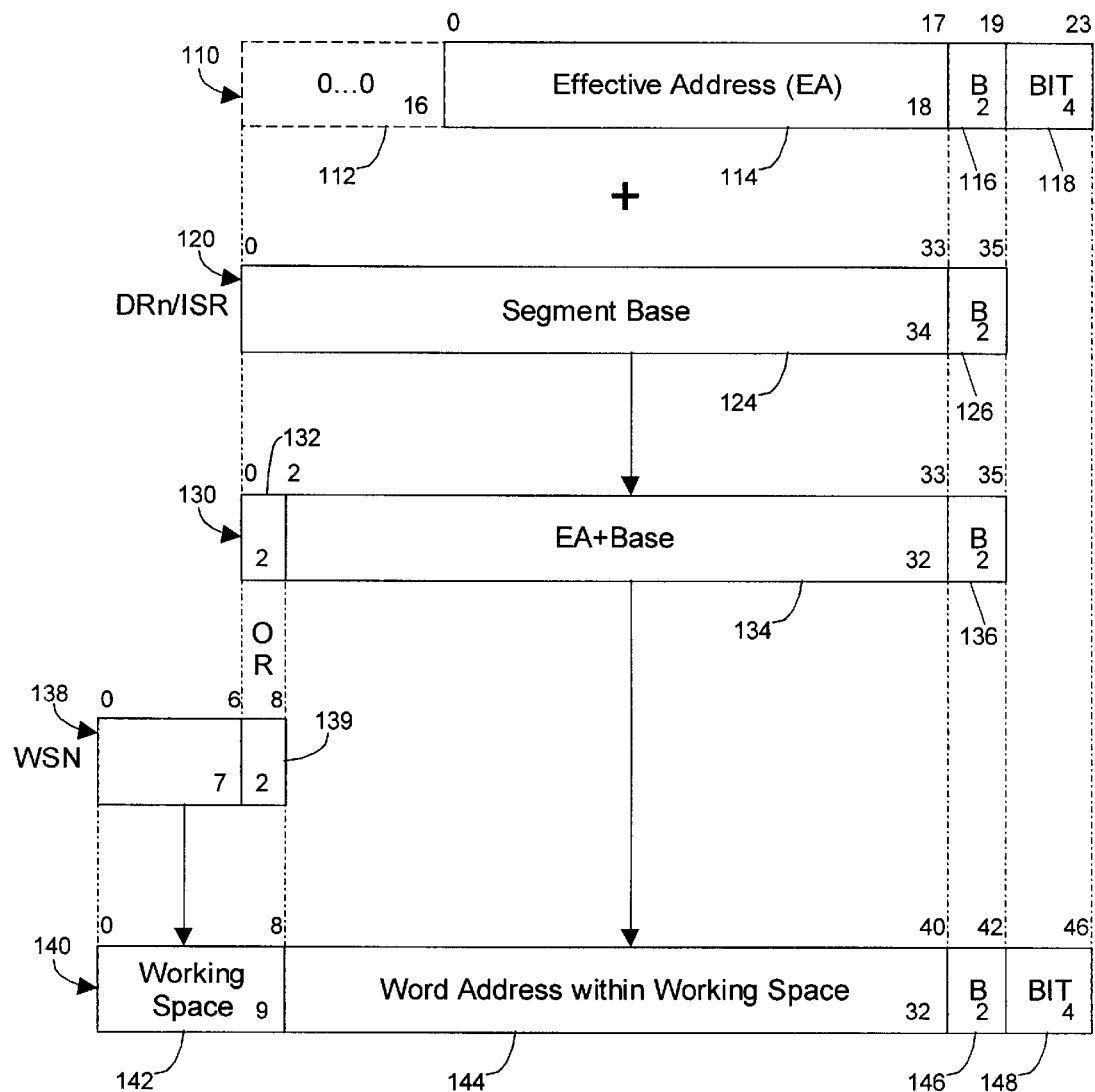
FIG. 2 is a block diagram illustrating virtual address generation using a standard segment descriptor in standard mode in a GCOS 8 system.

FIG. 2 is a block diagram illustrating virtual address generation using a standard segment descriptor in standard mode in a GCOS 8 system. The effective address (EA) 110 is typically generated during instruction execution. Typically, during each instruction cycle two different effective addresses 110 are generated: the address of the instruction to fetch for execution, and an instruction operand address. The virtual address generation shown here must be done for both. The effective address (EA) 110 is typically generated differently for different types of instructions and instruction modification types. For example, the effective address (EA) 110 may be loaded from memory, generated directly from the instruction, or be calculated as the sum of one or more registers and a constant. The GCOS 8 architecture also supports an indirect addressing mode that provides that an operand address specifies the address of an operand address, or the address of an address of an operand address, etc.

The Effective Address (EA) 110 in NS mode consists of four parts: sixteen leading zeroes 112; an 18-bit effective word address 114; a 2-bit byte offset within word 116; a 4-bit bit offset within byte 118. The Effective Address (EA) 110 is added to a segment base address 120. The segment base address 120 comprises: a segment word address 124; and a segment byte offset 126. The segment base address is provided from one of the system segment registers discussed further in FIGS. 11–14. The summation 130 of the effective address (EA) plus the segment base comprises: a 2-bit workspace modifier 132; a 32-bit word offset 134; and a 2-bit byte offset 136. The 2-bit workspace modifier 132 is ORed with the lower 2-bits 139 of a 9-bit workspace number 138 to generate an effective workspace number 142. A 47-bit virtual address 140 is then generated comprising: the effective 9-bit working space number 142; a 32-bit word address within working space 144; a 2-bit byte offset within word 146; and a 4-bit bit offset within byte 148, from: the workspace number 135 ORed with the workspace number in the EA+Base 132; the EA+Base 134; and the bit offset in the Effective Address 118. It should be noted here that since the vast majority of GCOS 8 instructions executed do not utilize the virtual memory bit offset 148, it can be efficiently carried separately from the remainder of the virtual address 140 for those rare cases where it is needed.

Figure 3:
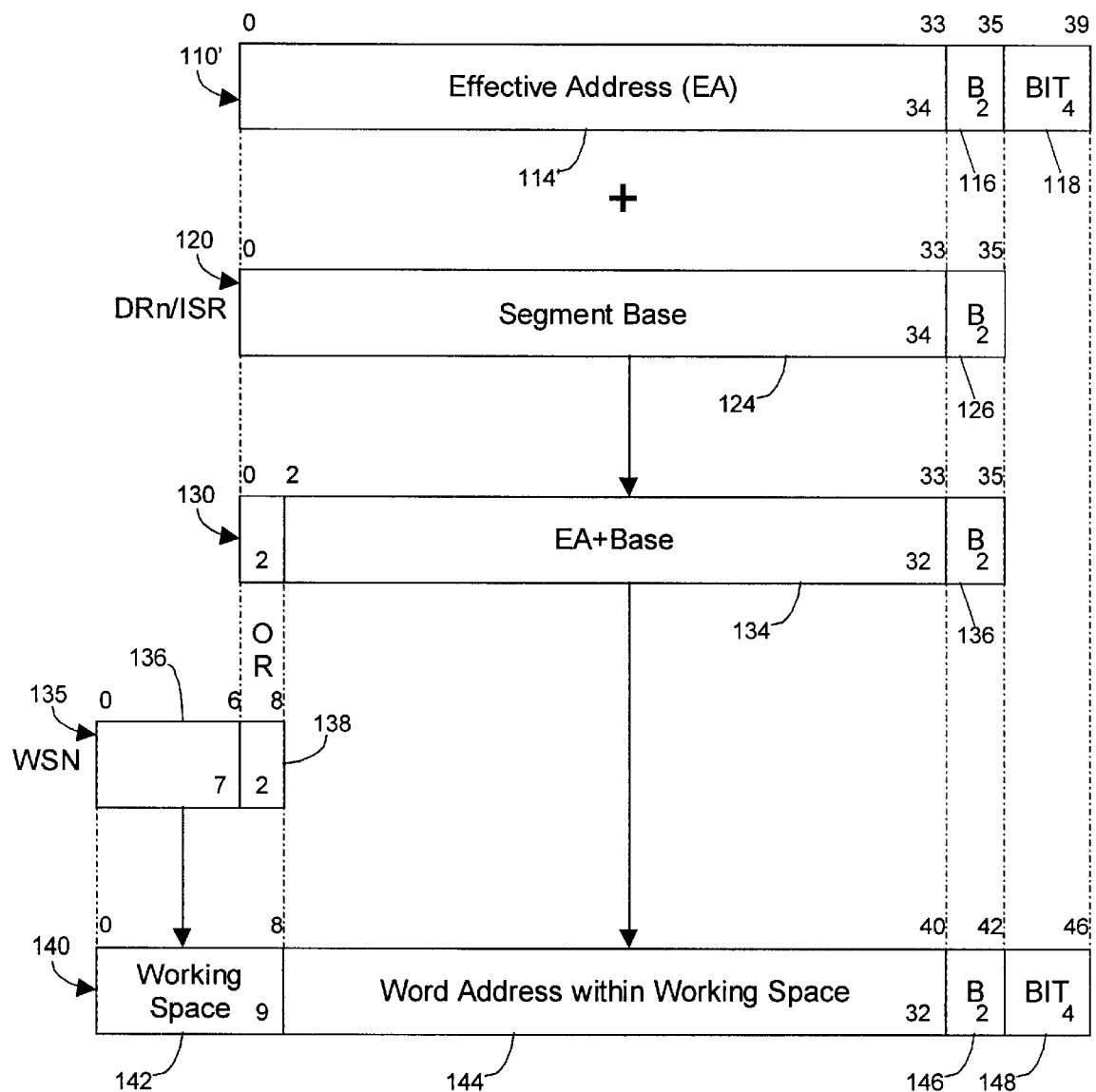
FIG. 3 is a block diagram illustrating address generation in ES or ESI mode in GCOS 8 computer systems.

FIG. 3 is a block diagram illustrating address generation in ES or ESI mode in GCOS 8 computer systems. It is identical to the address generation in FIG. 4 with the exception that a 34-bit effective word address 114' is utilized to form the effective address (EA) 110' instead of zero-filling an 18-bit effective word address 114 with sixteen zero bits to the left.

Figure 4:
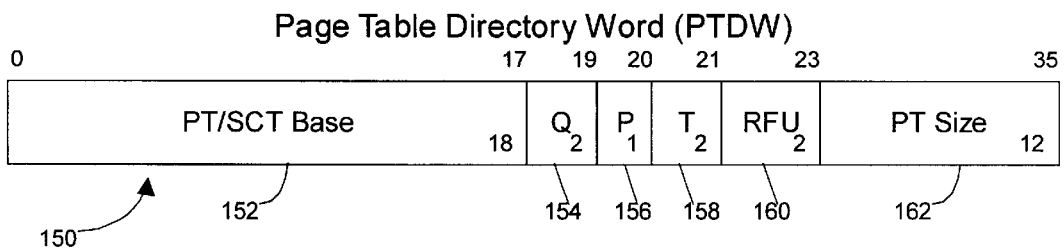
FIG. 4 is a diagram of the format of a page table directory word (PTDW) in the GCOS 8 architecture.

FIG. 4 is a diagram of the format of a page table directory word (PTDW) 150 in the GCOS 8 architecture. The format of a 36-bit page table directory word (PTDW) 150 is shown in table T-1:

TABLE T-1

| Page Table Directory Word (PTDW) Format | | | | | |
|---|---|---|---|---|---|
| Ref | St | Ed | B# | Field Name | Field Description |
| 152 | 00 | 17 | 18 | PT/SCT Base | Page table/Section table base |
| 154 | 18 | 19 | 2 | Q | Forces isolation of WS# |
| 156 | 20 | 20 | 1 | P | Presence bit: |
| | | | | | 0 - not present |
| | | | | | 1 - present |

TABLE T-1-continued

Page Table Directory Word (PTDW) Format

| Ref | St | Ed | B# | Field Name | Field Description |
|---|---|---|---|---|---|
| 158 | 21 | 22 | 2 | T | Type of page/section table: |
| | | | | | 00 - Dense page table |
| | | | | | 10 - Fragmented page table |
| | | | | | 01 - Section table |
| | | | | | 11 - Forces fault to occur |
| 160 | 23 | 23 | 1 | RFU | Reserved for Future Use |
| 162 | 24 | 35 | 12 | PT/SCT size | Size of PT/SCT |

The PCT/SCT base 152 is a modulo 1024 (210) base address of a page table (PT) or section table (SCT). The PT/SCT size 162 field contains different information depending on the type of page table involved. For a dense page table (T=00), bits 24–35 indicate the modulo 64 size of the page table (PT). For a section table (T=01), bits 30–35 indicate the modulo 64 size of the SCT. Fragmented page tables (T=10) are not supported by the GCOS 8 operating system. If bits 30–35 are zero, a size of 64 words are assumed, and bits 24 through 29** are ignored.

Figure 5:
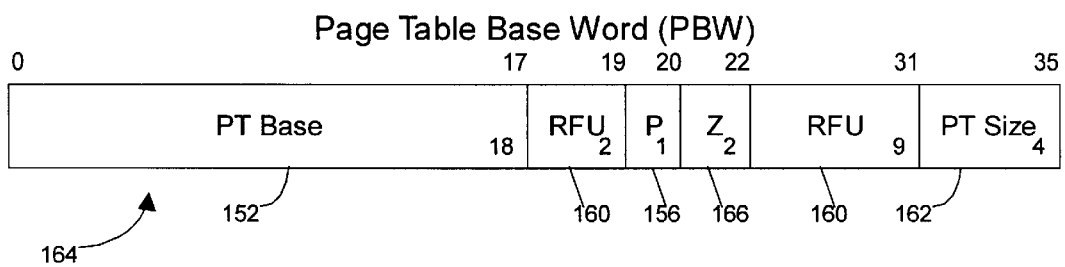
FIG. 5 is a diagram of the format of a page table base word (PBW) in the GCOS 8 architecture.

FIG. 5 is a diagram of the format of a page table base word (PBW) 164 in the GCOS 8 architecture. Page table base words (PBW) 164 are utilized to address page tables (PT) and are the entries in a section table (SCT). The format of a 36-bit page table base word (PBW) 164 is shown in table T-2:

TABLE T-2

Page Table Base Word (PBW) Format

| Ref | St | Ed | B# | Field Name | Field Description |
|---|---|---|---|---|---|
| 152 | 00 | 17 | 18 | PT Base | Page table/Section table base |
| 160 | 18 | 19 | 2 | RFU | Reserved for Future Use |
| 156 | 20 | 20 | 1 | P | Presence bit: |
| | | | | | 0 - not present |
| | | | | | 1 - present |
| 166 | 21 | 22 | 2 | MBZ | Must be zero |
| 160 | 23 | 31 | 9 | RFU | Reserved for Future Use |
| 162 | 32 | 35 | 4 | PT size | Size of Page Table |

The PT base field 152 contains the modulo 1024 (210) base address of a dense page table. The PT size field 162** contains the modulo 64 size of a dense page table. If it is zero, a page table size of 64 words is assumed.

Figure 6:
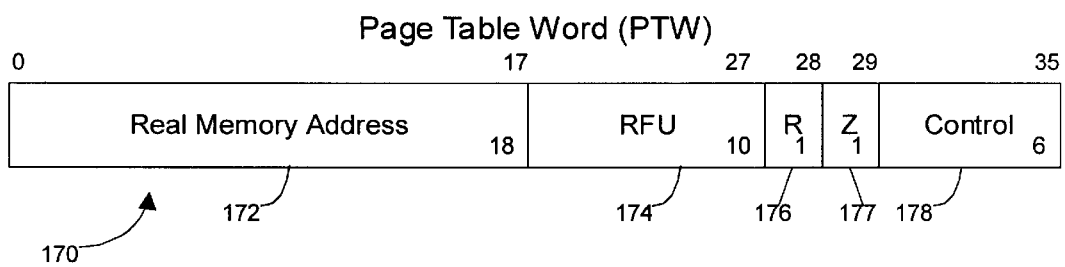
FIG. 6 is a diagram of the format of a page table word (PTW) in the GCOS 8 architecture.

FIG. 6 is a diagram of the format of a page table word (PTW) 170 and are the entries in a page table (PT) in the GCOS 8 architecture. Each page table word (PTW) 170 describes one page of real memory. The format of a 36-bit page table word (PTW) 170 is shown in table T-3:

TABLE T-3

Page Table Word (PTW) Format

| Ref | St | Ed | B# | Field Name | Field Description |
|---|---|---|---|---|---|
| 172 | 00 | 17 | 18 | Real Memory Address | The Real Address of a Memory Page |
| 174 | 18 | 27 | 10 | RFU | Reserved for Future Use |
| 176 | 28 | 28 | 1 | R | Reserved for Software |
| 177 | 29 | 29 | 1 | MBZ | Must be Zero |
| 178 | 30 | 35 | 6 | Control | Control Field Bits: |
| | | | | | 30 - CPU page present |
| | | | | | 31 - Write permitted |

TABLE T-3-continued

Page Table Word (PTW) Format

| Ref | St | Ed | B# | Field Name | Field Description |
|---|---|---|---|---|---|
| | | | | | 32 - Housekeeping |
| | | | | | 33 - IO page present |
| | | | | | 34 - Page modified |
| | | | | | 35 - Page Accessed |

The Real Memory Address field contains the real address of a Memory Page.

Figure 7:
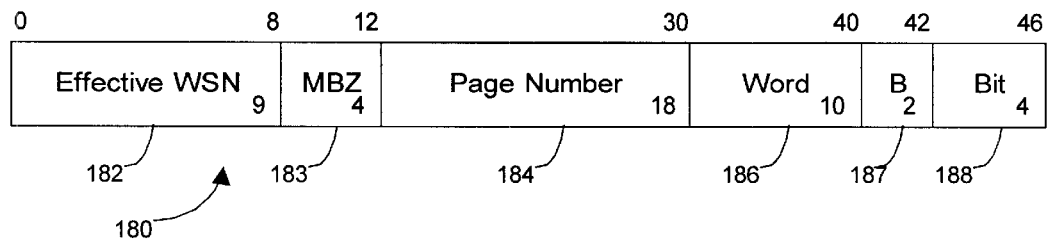
FIG. 7 is a diagram illustrating the format of a virtual address when addressing a workspace described by dense page tables.

FIG. 7 is a diagram illustrating the format of a virtual address when addressing a workspace containing dense page tables (PTDW 150 T field 158=00). The virtual address 180 contains: a 9-bit effective workspace number 182; 4-bit unused field that must be zero (MBZ) 183; an 18-bit page number 184; a 10-bit word offset within page 186; a 2-bit byte offset within word 187; and a 4-bit bit offset within byte 188. The virtual address 180 in this FIG. 7 corresponds to the virtual address 140 shown in FIGS. 2 and 3. As noted before, the vast majority of instructions executed in the GCOS 8 architecture do not utilize bit addressing. For that reason, in the preferred embodiment of the present invention, the bit offset 188 is maintained, when needed, separately from the remainder of the virtual address.

Figure 8:
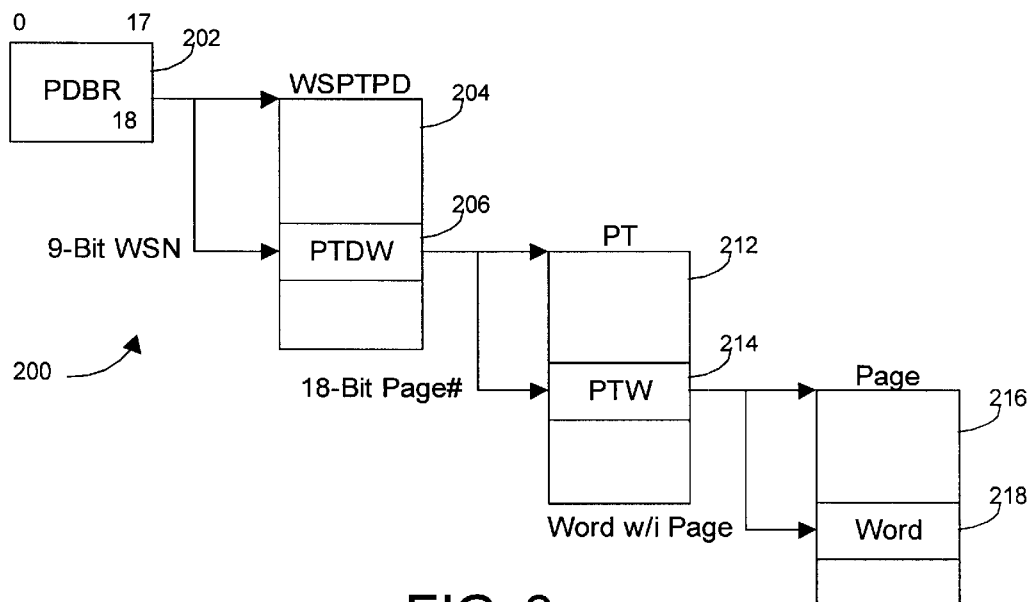
FIG. 8 is a block diagram that illustrates virtual address mapping using a dense page table in the GCOS 8 architecture and the virtual address mapping shown in FIG. 7.

FIG. 8 is a block diagram that illustrates virtual address mapping 200 using a dense page table in the GCOS 8 architecture. A page directory base register (PDBR) 202 contains a pointer to a Working Space Page Table Directory (WSPTPD) 204. The WSPTPD 204 contains Page Table Directory Words (PTDW) 150 (see FIG. 4). The effective working space number 182 is utilized to index into the WSPTPD 204 in order to select the appropriate PTDW 206. The selected Page Table Directory Word (PTDW) 206 in turn addresses a Page Table (PT) 212. Page Tables (PT) 212 contain Page Table Words 170 (see FIG. 6). The page number 184 portion of the virtual address 180 is utilized to index into the Page Table (PT) 212 to select the appropriate Page Table Word 214. The selected Page Table Word (PTW) 214 addresses one page of real memory. The word offset 186 portion of the virtual address 180 is then utilized to index into the selected page of memory 216 to address the selected word 218. The byte 187 and bit 188 offsets are then utilized to index into the selected word 218, when necessary.

Figure 9:
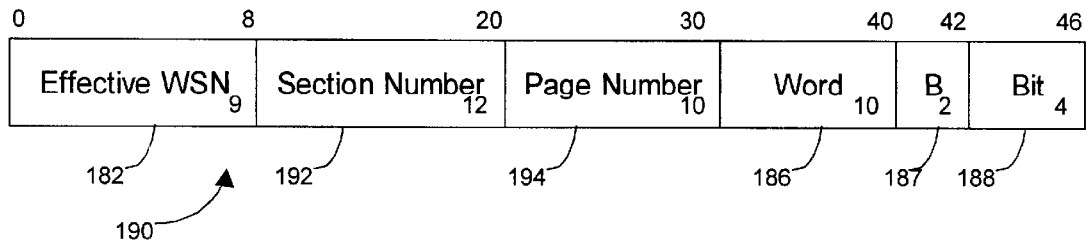
FIG. 9 is a diagram illustrating the format of a virtual address when addressing a workspace described by section tables.

FIG. 9 is a diagram illustrating the format of a virtual address when addressing a workspace containing section tables (PTDW 150 T field 158=01). The virtual address 190 contains: a 9-bit effective workspace number 182; a 12-bit section number 192; a 10-bit page number 194; a 10-bit word offset within page 186; a 2-bit byte offset within word 187; and a 4-bit bit offset within byte 188. The virtual address 190 in this FIG. 9 corresponds to the virtual address 140 shown in FIGS. 2 and 3.

Figure 10:
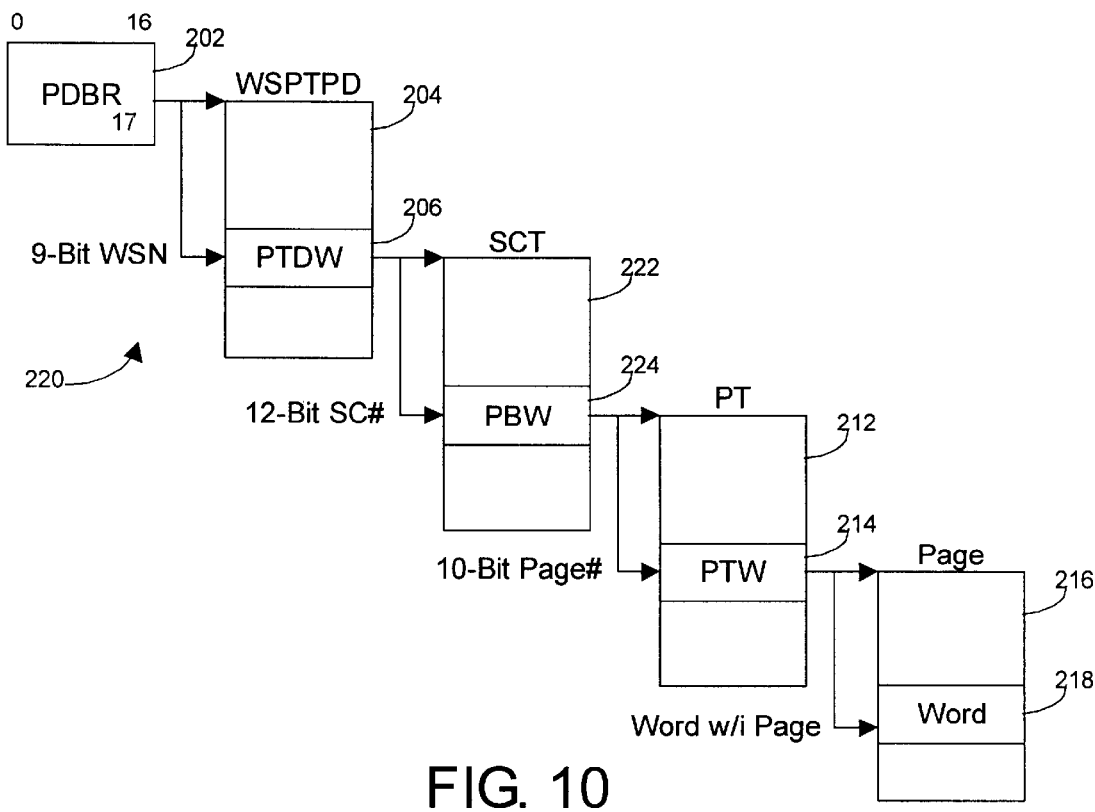
FIG. 10 is a block diagram that illustrates virtual address mapping using a section table in the GCOS 8 architecture and the virtual address mapping shown in FIG. 9.

FIG. 10 is a block diagram that illustrates virtual address mapping 220 using a section table in the GCOS 8 architecture using the virtual address format shown in FIG. 9. A page directory base register (PDBR) 202 contains a pointer to a Working Space Page Table Directory (WSPTPD) 204. The WSPTPD 204 contains Page Table Directory Words (PTDW) 150 (see FIG. 4). The effective working space number 182 is utilized to index into the WSPTPD 204 in order to select the appropriate PTDW 206. The selected Page Table Directory Word (PTDW) 206 in turn addresses a section table (SCT) 222. The section table (SCT) 222 contains Page Table Base Words (PBW) 164 (see FIG. 5). The section number 192 is utilized to index into the section table (SCT) 222 to address a Page Table Base Word (PBW) 224. The selected PBW 224 addresses a Page Table (PT) 212. Page Tables (PT) 212 contain Page Table Words 170 (see FIG. 6). The page number 194 portion of the virtual address 190 is utilized to index into the Page Table (PT) 212 to select the appropriate Page Table Word 214. The selected Page Table Word (PTW) 214 addresses one page of real memory. The word offset 186 portion of the virtual address 190 is then utilized to index into the selected page of memory 216 to address the selected word 218. The byte 187 and bit 188 offsets of the virtual address 190 are then utilized to index into the selected word 218, when necessary.

FIGS. 11 through 14 are diagrams that illustrate the contents of modified segment descriptor registers in accordance with a preferred embodiment of the present invention. In the preferred embodiment, optimized addressing is utilized to address real memory utilizing thirteen segment descriptor registers in the GCOS 8 environment. The thirteen segment descriptor registers are: eight Segment Descriptor Registers (DR0 through DR7) for operand addressing; an Argument Stack Register (ASR); a Data Stack Descriptor Register (DSDR); an Instruction Segment Register (ISR); a Linkage Segment Register (LSR); and a Parameter Segment Register (PSR). In the GCOS 8 environment, segment descriptors are 72-bits in size and are used to describe a contiguous subset of a working space.

In the preferred embodiment, each of the registers is represented by three 36-bit word entries plus a 1-bit validity flag. The first two 36-bit words contain the 2-word segment descriptor as stored in memory. Alternatively, all segment descriptors can be stored in a common standard format. The third 36-bit word contains a segment (PT) table pointer. It should be noted that in the preferred embodiment, the three 36-bit words for each segment register are stored in words or registers of the Host (or emulating) computer. These words and registers are typically wider than 36-bits. For example, each of the 36-bit words can be stored in a separate 64-bit word or register in architectures supporting that size of word.

Figure 11:
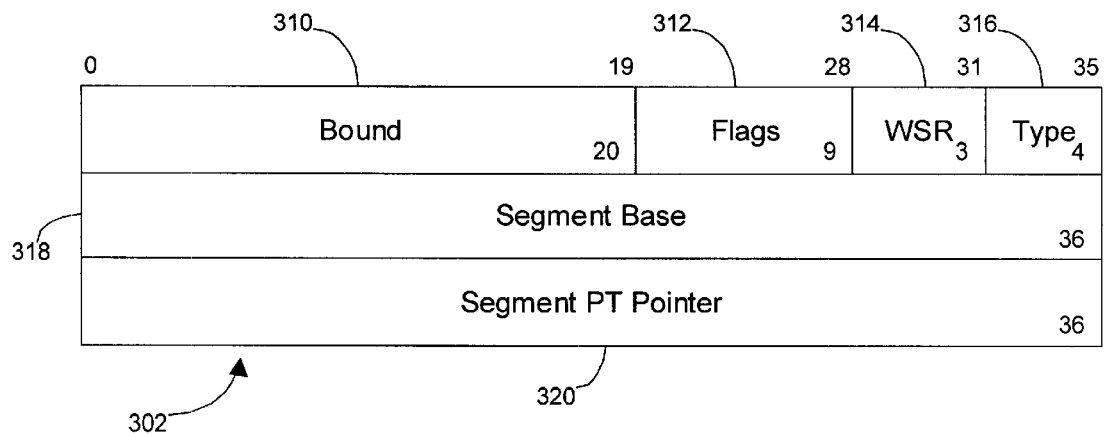
FIGS. 11 through 14 are diagrams that illustrate the contents of modified segment descriptor registers in accordance with a preferred embodiment of the present invention.

FIG. 11 is a diagram illustrating the segment register representation of a standard segment descriptor in a preferred embodiment of the present invention. The segment register representation 302 comprises three words stored as 36-bit values in three words or registers. The format of the segment register representation is shown in table T-4:

TABLE T-4

Standard Segment Descriptor 302 Format

| Ref# | Wd | St | Ed | B# | Field Name | Field Description |
|---|---|---|---|---|---|---|
| 310 | 0 | 00 | 19 | 20 | Bound | Segment upper bound |
| 312 | 0 | 20 | 28 | 9 | Flags | Flags: |
| | | | | | | 20 - Read allowed |
| | | | | | | 21 - Write allowed |
| | | | | | | 22 - Store by STDn Allowed |
| | | | | | | 23 - Cache use control |
| | | | | | | 24 - NS/ES mode |
| | | | | | | 25 - Execute allowed |
| | | | | | | 26 - Privilege required |
| | | | | | | 27 - Bound valid |
| | | | | | | 28 - Segment available |
| 314 | 0 | 29 | 31 | 3 | WSR | Working Space Register |
| 316 | 0 | 32 | 35 | 4 | Type | Segment Descriptor Type |
| | | | | | | 0 - frames operand space |
| | | | | | | 1 - frames descriptors |
| | | | | | | 12 - extended descriptor |

TABLE T-4-continued

Standard Segment Descriptor 302 Format

| Ref# | Wd | St | Ed | B# | Field Name | Field Description |
|---|---|---|---|---|---|---|
| 318 | 1 | 0 | 35 | 36 | Base | Segment Base Address |
| 320 | 2 | 0 | 35 | 36 | PT Pointer | Segment PT Pointer |
| 330 | 3 | 35 | 35 | 1 | Valid | Segment Valid Flag |

The 3-bit Working Space Register (WSR) 314 field designates one of eight 9-bit working space registers. The contents of the selected WSR 314 are retrieved and used as the working space for the segment. The 20-bit bound field 324 contains the maximum valid byte address within the segment. The 36-bit base field 318 contains a virtual byte address that is relative to the start of the designated working space defined by the WSR 314. Bits 0:33 are a 34-bit word address, and bits 34:35 identify a 9-bit byte within the word.

Figure 12:
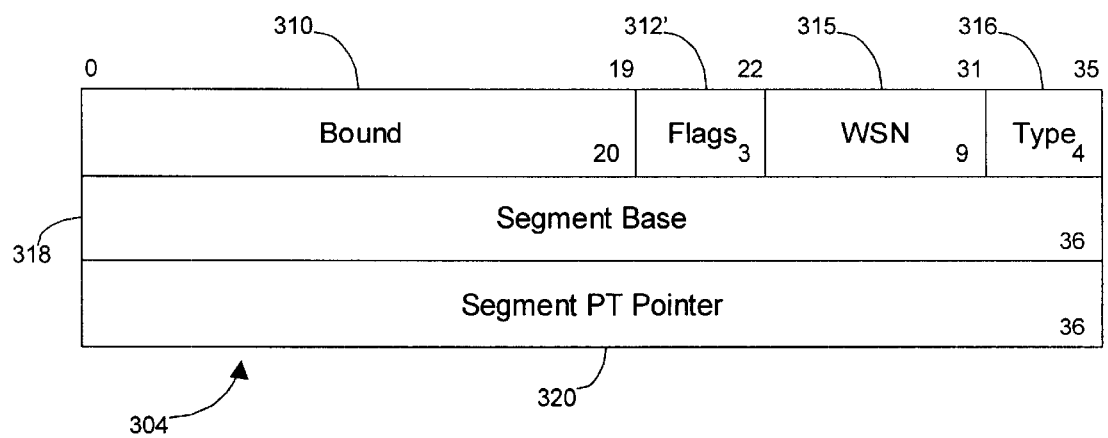

FIG. 12 is a diagram illustrating the segment register representation of a standard segment descriptor with working space number in a preferred embodiment of the present invention. The segment register representation 304 comprises three words stored as 36-bit values in three words or registers. The format of the segment register representation is shown in table T-5:

TABLE T-5

Standard Segment Descriptor 304 Format

| Ref# | Wd | St | Ed | B# | Field Name | Field Description |
|---|---|---|---|---|---|---|
| 310 | 0 | 00 | 19 | 20 | Bound | Segment upper bound |
| 312' | 0 | 20 | 22 | 3 | Flags | Flags: |
| | | | | | | 20 - Read allowed |
| | | | | | | 21 - Write allowed |
| | | | | | | 22 - Store by STDn Allowed |
| 315 | 0 | 23 | 31 | 9 | WSN | Working Space Number |
| 316 | 0 | 32 | 35 | 4 | Type | Segment Descriptor Type |
| | | | | | | 2 - frames operand space |
| | | | | | | 3 - frames descriptors |
| | | | | | | 14 - extended descriptor |
| 318 | 1 | 0 | 35 | 36 | Base | Segment Base Address |
| 320 | 2 | 0 | 35 | 36 | PT Pointer | Segment PT Pointer |
| 330 | 3 | 35 | 35 | 1 | Valid | Segment Valid Flag |

The descriptor format 304 shown in FIG. 12 is identical to the descriptor format 302 shown in FIG. 11 with the exception that it includes a work space number 315 instead of a work space register number 314. In evaluation the descriptor in FIG. 11, the corresponding working space register is accessed to provide the 9-bit working space number, whereas in FIG. 12, the 9-bit working space number is loaded directly from the descriptor. The first 3-bits of flags 312, 312' are identical between the two formats of segment descriptors 302, 304. The remaining 6-bits of flags 312 from standard segment descriptors 302 containing a working space register 314 field are set to standard values in standard descriptors 304 containing a working space number 315 field.

Figure 13:
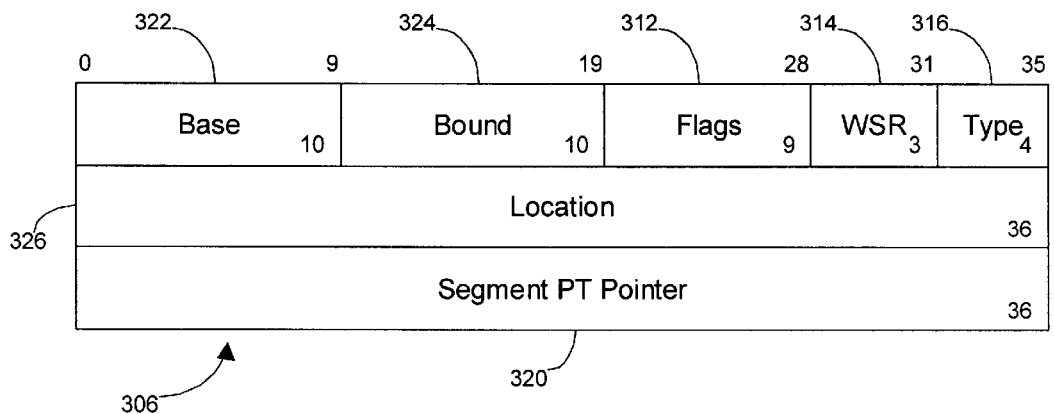

FIG. 13 is a diagram illustrating the segment register representation of a super segment descriptor in a preferred embodiment of the present invention. Super segment descriptors are utilized for segments larger than 256 k (218) words. The base 322 and bound 324 values are MOD 64 k (216) words. The segment register representation 36 comprises three words stored as 36-bit values in three words or registers. The format of the segment register representation is shown in table T-6:

TABLE T-6

Super Segment Descriptor 306 Format

| Ref# | Wd | St | Ed | B# | Field Name | Field Description |
|------|----|----|----|----|------------|-------------------|
| 322 | 0 | 00 | 09 | 10 | Base | Base address of segment |
| 324 | 0 | 10 | 19 | 10 | Bound | Upper bound of segment |
| 312 | 0 | 20 | 28 | 9 | Flags | Flags |
| 314 | 0 | 29 | 31 | 3 | WSR | Working Space Register |
| 316 | 0 | 32 | 35 | 4 | Type | Segment Descriptor Type 4 - frames operand space |
| 326 | 1 | 0 | 35 | 36 | Location | Starting address of segment from base |
| 320 | 2 | 0 | 35 | 36 | PT Pointer | Segment PT Pointer |
| 330 | 3 | 35 | 35 | 1 | Valid | Segment Valid Flag |

The segment descriptor format 306 shown in FIG. 13 is identical with the descriptor format shown in FIG. 11 with the exception that both the base 322 and the upper bound 324 for the segment are 10-bit values and are MOD 64 k (2**16) words. A segment framed by this type of descriptor extends from base+location through base+bound.

Figure 14:
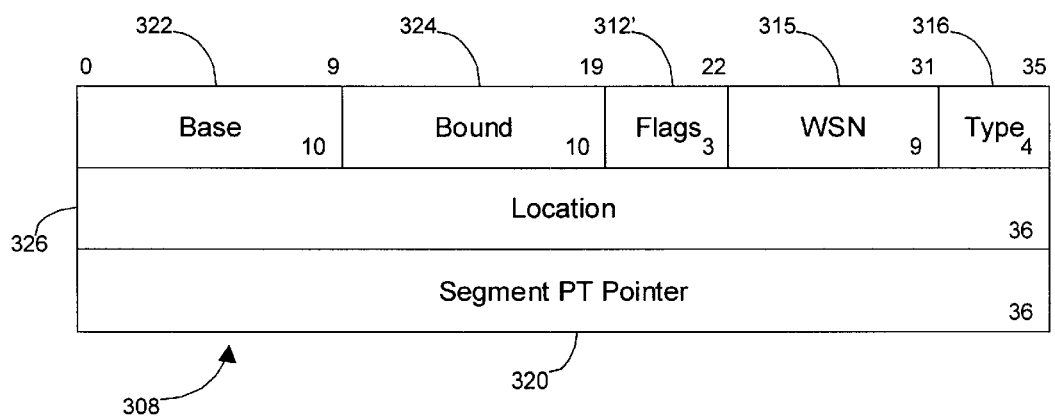

FIG. 14 is a diagram illustrating the segment register representation of a super segment descriptor containing a working space number in a preferred embodiment of the present invention. Super segment descriptors are utilized for segments larger than 256 k (2**18) words. The segment register representation 308 comprises three words stored as 36-bit values in three words or registers. The format of the segment register representation is shown table T-7:

TABLE T-7

Super Segment Descriptor 308 Format

| Ref# | Wd | St | Ed | B# | Field Name | Field Description |
|------|----|----|----|----|------------|-------------------|
| 322 | 0 | 00 | 09 | 10 | Base | Base address of segment |
| 324 | 0 | 10 | 19 | 10 | Bound | Upper bound of segment |
| 312' | 0 | 20 | 22 | 3 | Flags | Flags |
| 315 | 0 | 23 | 31 | 9 | WSN | Working Space Number |
| 316 | 0 | 32 | 35 | 4 | Type | Segment Descriptor Type 6 - frames operand space |
| 326 | 1 | 0 | 35 | 36 | Location | Starting address of segment from base |
| 320 | 2 | 0 | 35 | 36 | PT Pointer | Segment PT Pointer |
| 330 | 3 | 35 | 35 | 1 | Valid | Segment Valid Flag |

The segment descriptor format 308 shown in FIG. 14 combines the super segment descriptor format shown in FIG. 13 with the presence of a working space number 315 as shown in FIG. 12.

Figure 15:
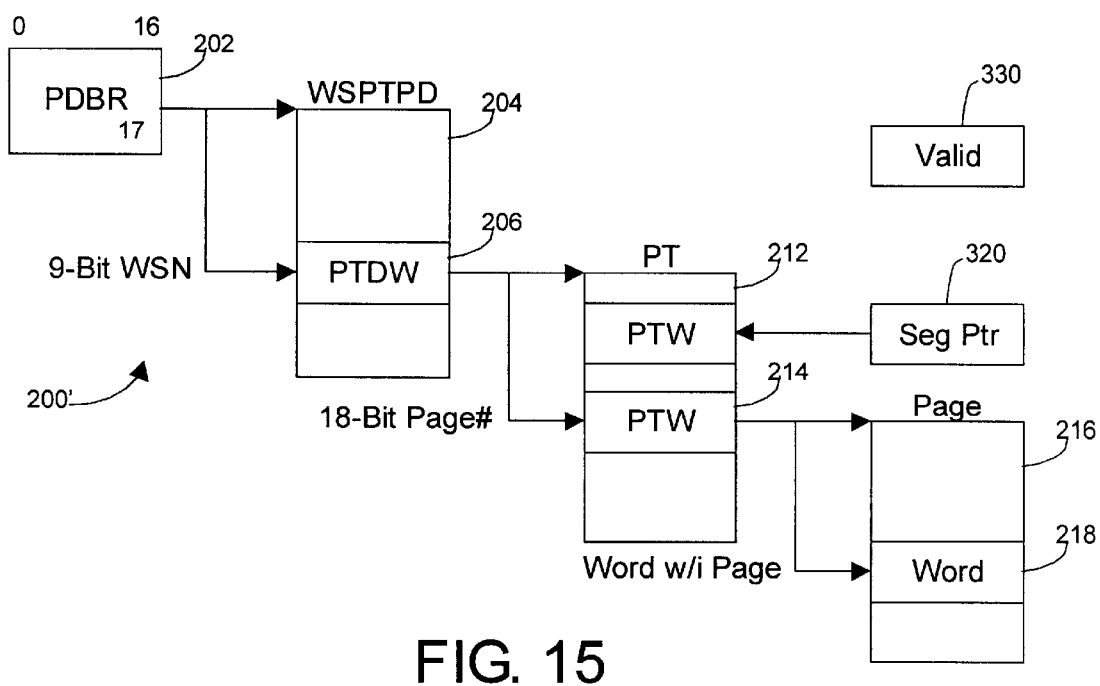
FIG. 15 is a block diagram that illustrates an improved virtual address mapping using a dense page table in the GCOS 8 architecture, in accordance with a preferred embodiment of the present invention.

FIG. 15 is a block diagram that illustrates an improved virtual address mapping 200 using a dense page table in the GCOS 8 architecture, in accordance with a preferred embodiment of the present invention. The tables shown in FIG. 15 are identical with the tables shown in FIG. 8. However, instead of starting with the effective address (EA) 114, computing virtual address 140 and working down through the memory hierarchy as shown in FIG. 8, the preferred embodiment utilizes the aforementioned segment page table pointer 320 to index to the page table word (PTW) of Page Table (PT) 212 containing the first word in the segment. The segment base 318 is broken into a page base, a word base, and a character (byte) base. The word base and character base of segment base 318 are added to the effective address to generate a page, word, and character offset from the page table word (PTW) of Page Table (PT) 212 containing the first word in the segment. This substantially reduces the number of cycles necessary for virtual to real address translation. The aforementioned valid flag 330 for the relevant segment is checked before the expedited virtual to real address translation, and if not set to indicate a valid segment page table pointer 320, full address translation, as shown in FIG. 8, is invoked. After the full address translation produces the address for the relevant page table 212, the segment page table pointer 320 associated with the segment descriptor can be modified to directly address the first page table framed by the segment, and the valid flag 330 can be set to a value indicating that the segment page table pointer 320 is valid.

In an alternate embodiment, the segment PT pointer 320 can address the first page table word in: the page table 212. A full segment base value 120 is then added to the effective address (EA) 120, with the lower 34-bits of the EA+base value 130 computed in FIG. 2 utilized to compute page within page table, word within page, and character within word. This method works efficiently with dense page tables, but may not work properly when section tables are utilized. In a second alternate embodiment, the valid flag 330 is stored as a special value in the segment PT pointer 320 word or register. For example, in situations where a zero page table address is disallowed, the special value can: be zero. This is not applicable with the GCOS 8 operating system. Another special value can be a negative number. This is easy to detect, and will not affect addressing when the number of bits per word in the Host system exceeds the number of bits per word in the Target system.

Figure 16:
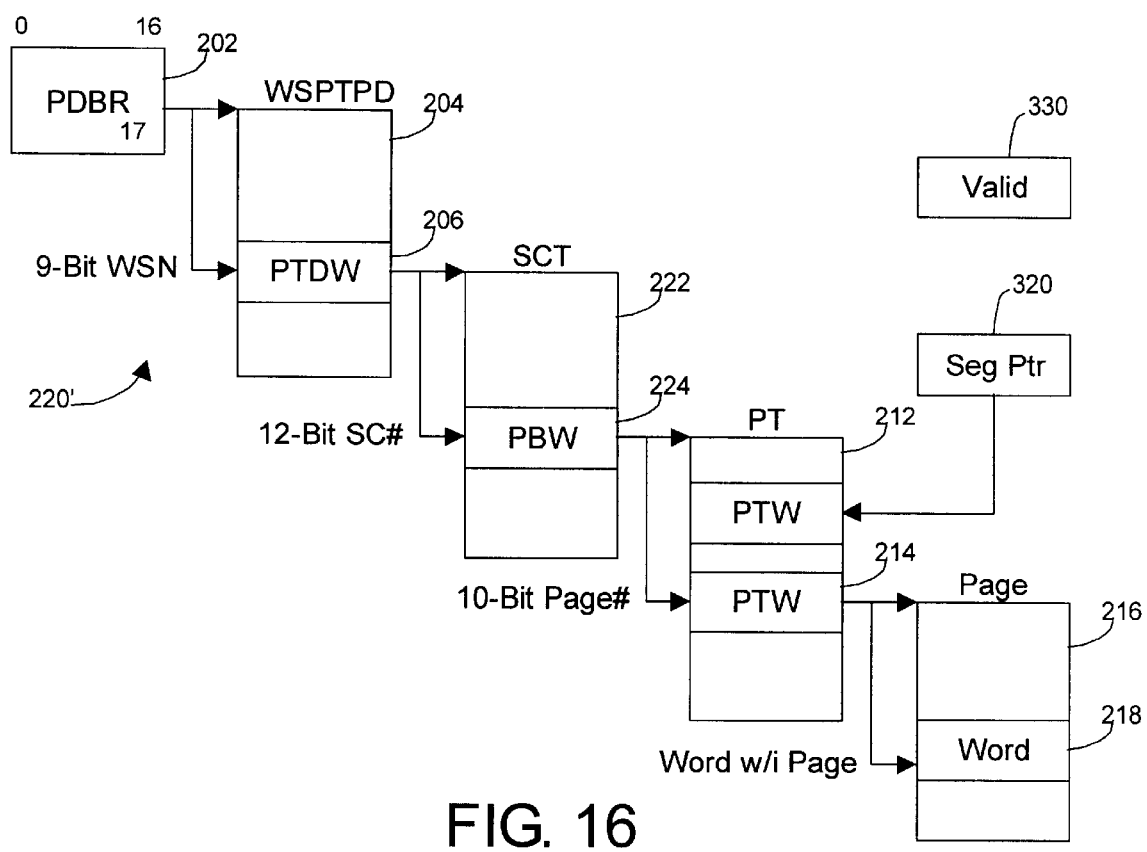
FIG. 16 is a block diagram that illustrates an improved virtual address mapping using a section table in the GCOS 8 architecture, in accordance with a preferred embodiment of the present invention.

FIG. 16 is a block diagram that illustrates an improved virtual address mapping 200 using a section table 222 in the GCOS 8 architecture, in accordance with a preferred embodiment of the present invention. The tables shown in FIG. 16 are identical with the tables shown in FIG. 10. However, instead of starting with the effective address (EA) 114, computing virtual address 140 and working down through the memory hierarchy as shown in FIG. 10, the preferred embodiment utilizes the aforementioned segment page table pointer 320 to index to the page table word (PTW) if Page Table (PT) 212 containing the first word in the segment. The segment base 318 is broken into a page base, a word base, and a character (byte) base. The word base and character base are added to the effective address to generate a page, word, and character offset from the page table word (PTW) of Page Table (PT) 212 containing the first word in the segment. This substantially reduces the number of cycles necessary for virtual to real address translation. The aforementioned valid flag 330 for the relevant segment is checked before the expedited virtual to real address translation, and if not set to indicate a valid segment page table pointer 320, full address translation, as shown in FIG. 10, is implemented. After the full address translation produces the address for the page table 212, the segment page table pointer 320 associated with the segment descriptor can be modified to directly address the first page table framed by the segment, and the valid flag 330 can be set to a value indicating that the segment page table pointer 320 is valid.

In this embodiment, it may arise that a single segment spans memory described by multiple page tables 212. When this occurs, a contiguous flag (not shown) can be utilized for each segment descriptor. Full virtual-to-real address translation could then be suppressed whenever the contiguous flag is in a state indicating that the segment does not span multiple page tables 212. Another alternative is to utilize a page table limit (not shown) for each segment. This page table limit could be in terms of either the effective address 110, or the address within working space 140. For example, if it is in terms of the address within working space 140, the highest address within the working space that is in the page table 212 addressed by the segment PT pointer 320 would be computed as the page table limit when the segment PT pointer 320 is set up. Then, whenever the address within working space 140 exceeds the page table limit, full virtual-to-real address translation could be utilized instead of the optimized access shown in FIG. 16.

The method described herein works for a number of reasons. First, page tables do not tend to move around. Rather, they typically are stationary for any given process or activity. Thus, except for certain situations described below, pointers into page tables can be maintained throughout process or activity dispatch. Note though that the contents of page tables do change over time. In particular, pages are paged into and out of physical memory. This is one reason why segment PT pointers 320 address page tables instead of actual memory pages.

Most memory references are done on a fairly small number of segment descriptor registers that frame memory. For example, instruction fetch addressing utilizes an Instruction Segment Register (ISR) to frame instructions being executed. In the preferred embodiment, high usage segment descriptor registers may be distinguished from lower usage segment descriptor registers, with the higher usage segment descriptor registers, including their associated PT pointer 320 resident in dedicated registers.

When using page table (PT) pointers 320 associated with segment descriptors, the reload of segment descriptor registers is infrequent relative to the total number of memory references. Thus, the cost of setting up PT pointers 320 is minimal compared to the entire cost of address formation and translation.

Page table (PT) pointers 320 associated with emulated segment descriptor registers need to be invalidated and/or updated in several situations. The first situation is when the associated segment descriptor register is modified. This is typically easy to detect in an emulator since the emulator by necessity has to emulate the (usually privileged) instructions that do the actual changing of segment register contents. The cost of updating the associated PT pointers 320 is minimal here since these instructions are by necessity infrequently executed. The PT pointer valid flag 330 for all segment descriptor registers should be cleared whenever the Page Table Base Register (PDBR) 202 is updated. This is presumably an extremely rare occurrence since it indicates a basic change of the emulated system's virtual memory structure. Similarly, other instructions have indirect affect on the validity of PT pointers 320. For example, loading a working space register implicitly invalidates all such PT pointers 320 that reference the working space register. In this case, either the associated segment descriptor PT pointers 320 are invalidated 330, or all such PT pointers 320 are invalidated 330. This later approach may be preferable despite the fact that some PT pointers 320 may be invalidated that don't need to be since the time spent determining which segments to invalidate need not be executed. In any case, the cost in terms of computer instructions executed, is de minimis here since these instructions again by necessity are infrequently executed.

More difficult to detect however are those situations where the virtual address structure is modified utilizing standard instructions that typically do not have side effects. In the preferred embodiment, this is addressed by "coloring" memory containing virtual memory translation tables. By "color" is meant that the emulator marks memory in a special way so that updates to that memory by the emulated system can be noted and special action taken. In the case here, the special action is that the PT pointer valid flag 330 for all of the segment descriptor registers are cleared whenever any of the higher level virtual memory translation tables are modified. Note that it is unnecessary to clear the PT pointer valid flag 330 when page table entries 214 in page tables 212 are modified since the PT pointers 320 access the virtual memory hierarchy at this level.

For the GCOS 8 embodiment, it is sufficient to mark only the memory of the Page Table Directory 204. For this reason, the marking can be implemented through a single range check, which may be maintained in a pair of registers in a register-rich Host system architecture. Since modifications to the Page Table Directory 204 are typically working space related, an alternative to invalidating all PT pointers 320 is to invalidate only those PT pointers 320 that have segment descriptors that reference the working space that had its Page Table Directory word 206 entry modified.

It should also be noted that in situations where there is access to the operating system source code for the Target system, instructions can be inserted in the Target operating system that notify the emulator of changes in the virtual memory hierarchy necessitating the invalidation of PT pointer valid flags 330. Typically these virtual memory hierarchy updates are reasonably few and well defined in a well constructed operating system. In particular, there are a minimum number of places in the Target operating system that modify the Page, Table Directory 204 to the extent that would necessitate invalidating PT pointer valid flags 330. This notification can be done for example by executing specially formatted NOP instructions. Alternatively, PT pointer valid flag 330 invalidation can be triggered by emulated execution of a Clear Associative Memory Paged (CAMP) instruction on any of the processors 42 in the system.

When an emulator updates memory that has been marked (or colored) as participating in a page table directory 204, and the emulation system is a multiprocessor system, it is necessary to notify the other processors 42 in the multiprocessor system concerning the updates since the page table directory 204 is shared between processors 42. Similarly, each processor 42 must be responsive to notification by other processors 42 that they have updated the page table directory 204. The processor 42 updating the page table directory 204 can do this notification by setting a cross processor PTW pointer invalidation flag (not shown) for each of the other processors 42 in the system performing emulation. This flag is preferably set after the memory update has been performed. The updating processor 42 should then delay until all other processors 42 have responded by resetting their own flag.

In conclusion, the overhead of emulating a Target computer system having virtual memory can be significantly reduced if full virtual to real memory translation can be avoided as often as possible. In systems with segments framing portions of virtual memory, this translation can be significantly reduced by maintaining a pointer table (PT) word pointer 320 associated with each segment descriptor register. Whenever a virtual address translates into the page table 212 addressed by the pointer table (PT) pointer 320, the corresponding page table word 214 pointing at the desired memory page 216 can be directly accessed without reference to the virtual memory hierarchy.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A method of emulating a Target computer system on a Host computer system, wherein:

the Target computer system supports a virtual memory addressed through a set of page tables containing a plurality of page table entries, each of the plurality of page table entries describes a page of real memory, the Target computer system utilizes a set of segment descriptors to frame portions of the virtual memory, and said method comprises:
- A) maintaining within the host computer system, a segment page table pointer to a first page table entry in a one of the set of page tables that corresponds to a segment defined by a segment descriptor stored in a segment descriptor register;
- B) utilizing the segment page table pointer to access a second page table entry in the one of the set of page tables when translating a virtual memory address to a real memory address; and
- C) referencing the page of real memory described by the second page table entry and corresponding to the real memory address.

2. The method in claim 1 wherein step (C) comprises:
1) isolating an offset within the page from the virtual memory address, and
2) adding the offset within the page to a page base address in the second page table entry to form the real memory address.

3. The method in claim 1 wherein step (B) comprises:
1) isolating a word base and a character base from a segment base of the segment descriptor;
2) biasing the word base and character base of an effective address by the word base and character base of the segment base forming a result which is divided by page size to form a page table entry offset; and
3) adding the page table entry offset to the segment page table pointer to form an address identifying the location of the second page table entry.

4. The method in claim 3 wherein step (B) further comprises:
4) verifying that the address of page table entry calculated in step 2) is within the page table containing the first page table entry.

5. The method in claim 1 which further comprises:
D) testing a segment page table entry pointer valid flag having a first logical state and a second logical state before step (B).

6. The method in claim 5 which further comprises:
E) computing a valid memory address value for the segment page table pointer when the segment page table entry pointer valid flag is in the first logical state; and
F) setting the segment page table entry pointer valid flag to the second logical state whenever the segment page table pointer is loaded with the valid memory address value.

7. The method in claim 6 which further comprises:
G) setting the segment page table entry pointer valid flag to the first logical state whenever a corresponding segment register is modified.

8. The method in claim 6 which further comprises:
G) setting the segment page table entry pointer valid flag to the first logical state whenever an underlying virtual memory structure is modified.

9. The method in claim 5 which further comprises:
E) testing a segment page table entry contiguous flag having a third logical state and a fourth logical state before step (B).

10. The method in claim 9 which further comprises:
F) computing a valid memory address value for the segment page table pointer when the segment page table entry pointer valid flag is in the first logical state and the segment page table entry contiguous flag is in the third logical state.

11. Target emulation software stored in a Computer Software Storage Medium on a Host computer system for emulating a Target computer system, wherein:

the Target computer system supports a virtual memory addressed through a set of page tables containing a plurality of page table entries, each of the plurality of page table entries describes a page of real memory, the Target computer system utilizes a set of segment descriptors to frame portions of the virtual memory, and said Target emulation software comprises:
- A) a set of computer instructions for maintaining a segment page table pointer to a first page table entry in a one of the set of page tables that corresponds to a segment defined by a segment descriptor stored in a segment descriptor register;
- B) a set of computer instructions for utilizing the segment page table pointer to access a second page table entry in the one of the set of page tables when translating a virtual memory address to a real memory address; and
- C) a set of computer instructions for referencing the page of real memory described by the second page table entry and corresponding to the real memory address.

12. The Target emulation software in claim 11 wherein step (C) comprises:
1) a set of computer instructions for isolating an offset within the page from the virtual memory address, and
2) a set of computer instructions for adding the offset within the page to a page base address in the second page table entry to form the real memory address.

13. The Target emulation software in claim 11 wherein step (B) comprises:
1) isolating a word base and a character base from a segment base of the segment descriptor;
2) biasing the word base and character base of an effective address by the word base and character base of the segment base forming a result which is divided by page size to form a page table entry offset; and
3) adding the page table entry offset to the segment page table pointer to form an address identifying the location of the second page table entry.

14. The Target emulation software in claim 13 wherein step (B) further comprises:
   4) verifying that the address of page table entry calculated in step 2) is within the page table containing the first page table entry.

15. The Target emulation software in claim 11 which further comprises:
   D) a set of computer instructions for testing a segment page table entry pointer valid flag having a first logical state and a second logical state before step (B).

16. The Target emulation software in claim 15 which further comprises:
   E) a set of computer instructions for computing a valid memory address value for the segment page table pointer when the segment page table entry pointer valid flag is in the first logical state; and
   F) a set of computer instructions for setting the segment page table entry pointer valid flag to the second logical state whenever the segment page table pointer is loaded with the valid memory address value.

17. The Target emulation software in claim 16 which further comprises:
   G) a set of computer instructions for setting the segment page table entry pointer valid flag to the first logical state whenever a corresponding segment register is modified.

18. The Target emulation software in claim 16 which further comprises:
   G) a set of computer instructions for setting the segment page table entry pointer valid flag to the first logical state whenever an underlying virtual memory structure is modified.

19. The Target emulation software in claim 15 which further comprises:
   E) a set of computer instructions for testing a segment page table entry contiguous flag having a third logical state and a fourth logical state before set (B).

20. The Target emulation software in claim 19 which further comprises:
   F) a set of computer instructions for computing a valid memory address value for the segment page table pointer when the segment page table entry pointer valid flag is in the first logical state and the segment page table entry contiguous flag is in the third logical state.

21. A Non-Volatile Storage Medium containing Target emulation software that is executable on a Host computer system for emulating a Target computer system, wherein:
   the Target computer system supports a virtual memory addressed through a set of :page tables containing a plurality of page table entries,
   each of the plurality of page table entries describes a page of real memory,
   the Target computer system utilizes a set of segment descriptors to frame portions of the virtual memory, and
   said Target emulation software comprises:
   A) a set of computer instructions for maintaining a segment page table pointer to a first page table entry in a one of the set of page tables that corresponds to a segment defined by a segment descriptor stored in a segment descriptor register;
   B) a set of computer instructions for utilizing the segment page table pointer to access a second page table entry in the one of the set of page tables when translating a virtual memory address to a real memory address; and
   C) a set of computer instructions for referencing the page of real memory described by the second page table entry and corresponding to the real memory address.

\* \* \* \* \*